March 16, 1965 P. B. SHUTT 3,173,266
PUSH ROD RETAINER
Filed April 29, 1963 2 Sheets-Sheet 1

INVENTOR.
PAUL B. SHUTT
BY
Shelton F. Raizes
ATTORNEY

March 16, 1965  P. B. SHUTT  3,173,266
PUSH ROD RETAINER

Filed April 29, 1963  2 Sheets-Sheet 2

INVENTOR.
PAUL B. SHUTT
BY
*Sheldon F. Raizes*
ATTORNEY

United States Patent Office 3,173,266
Patented Mar. 16, 1965

3,173,266
PUSH ROD RETAINER
Paul B. Shutt, St. Joseph, Mich., assignor to The Bendix Corporation, St. Joseph, Mich., a corporation of Delaware
Filed Apr. 29, 1963, Ser. No. 276,282
15 Claims. (Cl. 60—54.6)

This invention concerns a device for assembling a push rod to a master cylinder assembly.

An object of this invention is to provide a master cylinder assembly with a simple and economical means for connecting a push rod thereto.

Another object of the invention is to provide a master cylinder with a mechanism for assembling a push rod to the master cylinder assembly merely upon insertion of the push rod into the master cylinder assembly.

Other objects of the invention will become apparent to those skilled in the art from the following description of the invention with reference to the drawings wherein.

Figure 1:
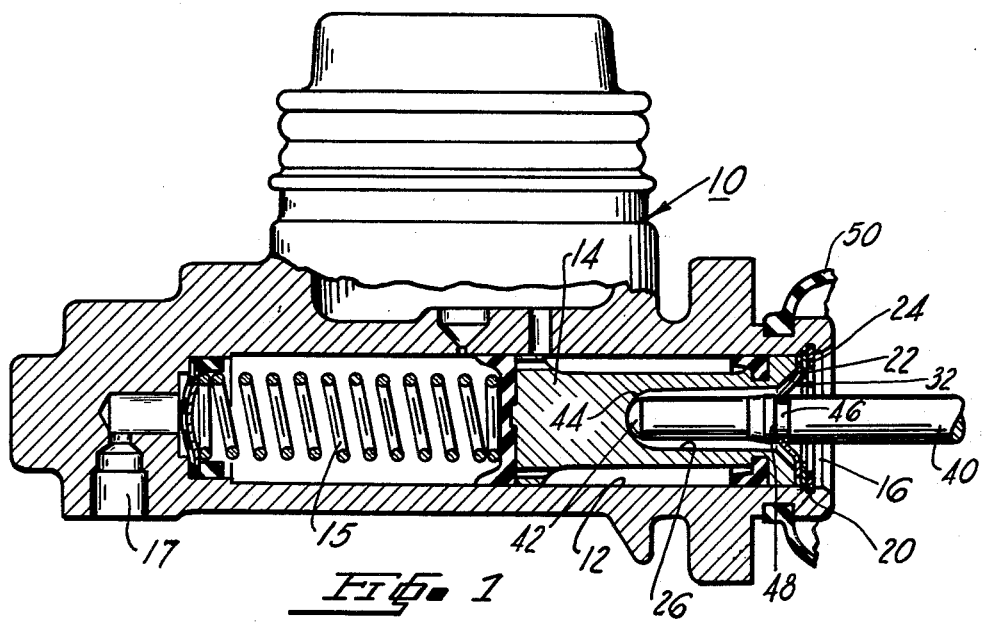
FIGURE 1 illustrates a master cylinder assembly in retracted position.
Figure 2:
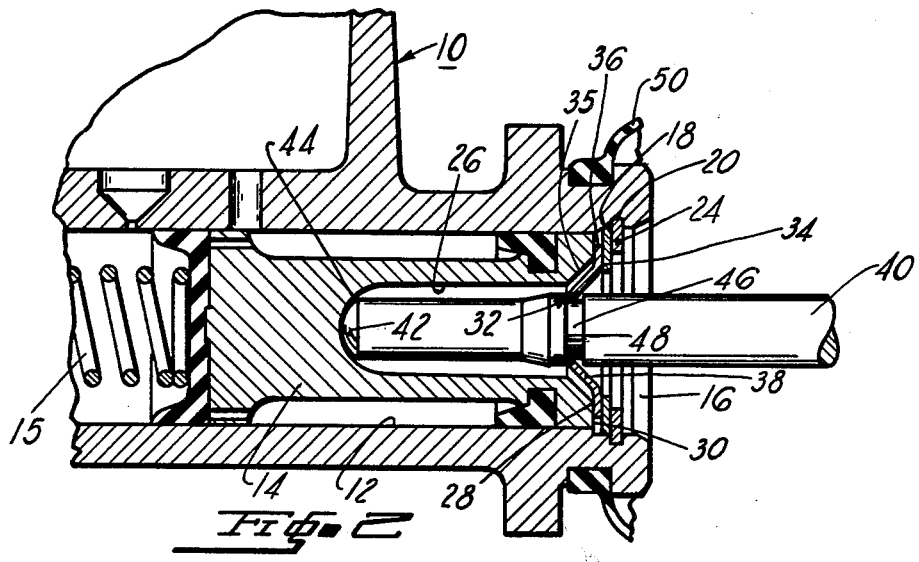
FIGURE 2 is a blown up partial view of FIG. 1.

Referring to the drawings, a master cylinder 10 is provided with a longitudinally extending bore 12 having a pressure producing piston 14 slidably mounted therein. A spring 15 acts on the piston 14 to return the same to retracted position after each actuation thereof. An outlet port 17 may be communicated to a plurality of brake wheel cylinders. The bore 12 has an open end portion 16 which has an annular shoulder 18 and an annular groove 20 which receives a snap ring 24 to retain a washer 22 against the annular shoulder 18. The piston 14 has a recessed portion 26 which defines a circular opening 28 at its intersection with the end surface 30 of the piston 14. A retaining member 32 is inserted between the washer 22 and the end surface 28 of the piston 14 and comprises an annular base portion 34 whose outer diameter is substantially less than the diameter of the bore 12 and thus the outer periphery 36 thereof is spaced from the wall of the bore 12. The outer diameter of the base portion 34 is greater than the inner diameter of the washer 22 and is greater than the diameter of the circular opening 28. A plurality of resilient fingers 38 are bent from the base portion 34 and extend into the chamfered portion 35 of the recess 26 of the piston 14. A push rod 40 is received through the open end 16 of the bore 12, the snap ring 24, the washer 22, and the retainer member 32 into the recess 26 of the piston 14 and has a rounded end portion 42 bearing on the end wall 44 of the piston recess 26. The free ends of the resilient fingers 38 are located within an annular groove 46 of the push rod 40 and bear on the shoulder 48 of the groove to retain the push rod with the master cylinder assembly. A boot 50 is connected to the master cylinder and to the push rod 40 for sealing the assembly from outside contaminates.

To connect the piston rod 40 to the master cylinder assembly, all that is necessary to do is to insert the push rod 40 through the open end 16 of the bore, the snap ring 20, the washer 22, and the retainer member 34 until the resilient fingers 38 snap into the annular groove 46 of the push rod.

If it is desired to remove the push rod 40 from the master cylinder assembly then the snap ring 20 and the washer 22 will have to be removed prior to the removal of the retainer member 32 and the push rod 40.

Figure 3:
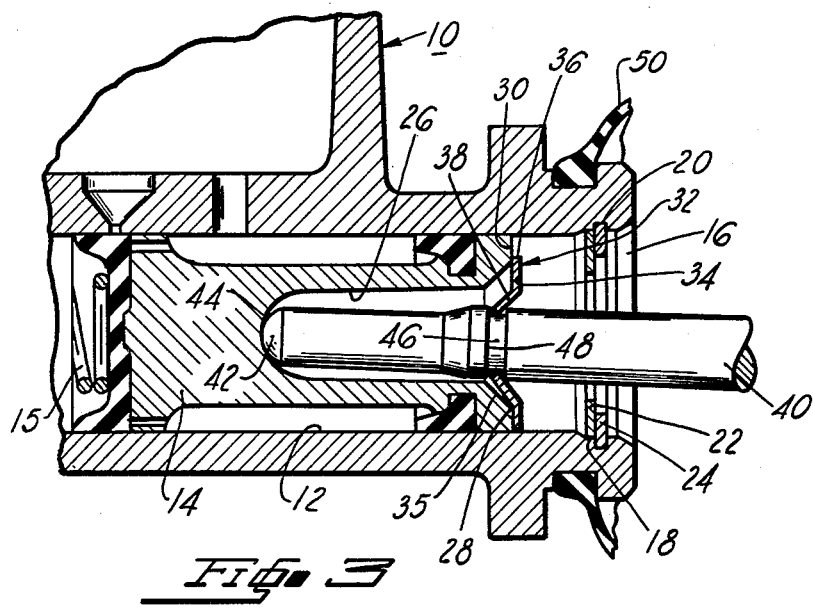
FIGURE 3 is a blown up partial view of the master cylinder assembly in actuating position.
Figure 4:
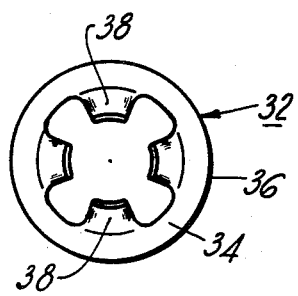
FIGURE 4 illustrates a view of a retaining member.

In operation (FIG. 3), the push rod 40 is moved to the left pushing the piston 14 to the left and carrying with it the retainer member 34 away from the snap ring 22. Since the outer diameter of the base member 34 is spaced from the wall of the bore 12, the retainer member is free to slide transverse to the axis of the bore to allow free tilting of the push rod 40. The return spring 15 returns the piston 14 and the push rod 40 to the retracted position.

Thus, it can be seen that the device for attaching the piston rod to the master cylinder is simple and cheap and the push rod may be attached to the master cylinder assembly with a minimum of effort.

Although this invention has been illustrated and described in connection with a specific embodiment, numerous other adaptations of the invention will become apparent to those skilled in the art from the description in conjunction with the accompanying claims whereby the same or substantially the same results may be obtained.

Having thus described the features of the invention, what I claim as new and desire to secure by Letters Patent is:

1. In a master cylinder: a housing having a bore open at the rear end thereof; a member slidable in said bore; said member having a recessed rear portion; means secured to the wall of said bore adjacent the open end thereof; a retainer member slidably mounted in said bore and located between and proportioned to be retained in the bore by said means and the rear end surface of said slidable member; a push rod extending through the open end of said bore, said means, and said retainer member into said recess; a thrust connection between said push rod and said slidable member; said push rod and said retainer member having means thereon coacting with each other to limit the rearward movement of said push rod and retaining the same in assembled relationship with said master cylinder.

2. In a master cylinder: a housing having a bore open at the rear end thereof; a member slidable in said bore; said member having a recessed rear portion; means secured to the wall of said bore adjacent the open end thereof; a retainer member slidably mounted in said bore and located between and proportioned to be retained in said bore by said means and the rear end surface of said slidable member; a push rod extending through the open end of said bore, said means and said retainer member into said recess; a thrust connection between said push rod and said slidable member; said push rod having an annular shoulder thereon, and means carried by said retainer member for engaging said annular shoulder limiting the rearward movement of said push rod and retaining the same in assembled relationship with said slidable member.

3. The structure recited in claim 4 wherein said means carried by said retainer member comprises resilient fingers for engaging said annular shoulder.

4. The structure as recited in claim 2 wherein the outer periphery of said retainer member is spaced from the wall of said bore.

5. In a master cylinder: a housing having a cylindrical bore open at the rear end thereof; a member slidable in said bore; said slidable member having a recess intersecting the rear surface of said slidable member; said recess defining a circular opening at said intersection; annular means secured to the wall of said bore adjacent to the open end thereof; a retainer member slidable in said bore and interposed between said annular means and said slidable member; said retainer member comprising an annular base portion disposed in said bore in a plane substantially perpendicular to the axis of said bore and resilient fingers bent from the inner edge of said base portion and extending into said recess; the outer diameter of said base portion being less than the diameter of said bore, but greater than the inner diameter of said annular means and the diameter of said circular opening whereby said retainer member is retained between said slidable member and said annular means; a push rod extending through the open end of said bore, said annular means, and said retainer member into said recess of said slidable member; a thrust connection between said push rod and said slidable member; said push rod having an annular groove thereon, the free end portions of said resilient fingers being located within said groove for limiting rearward movement of said push rod.

6. In a master cylinder: a housing having a bore open at the rear end thereof; a member slidable in said bore; said slidable member having a recessed rear portion; an annular shoulder in the wall of said bore; an annular groove in the wall of said bore located between said shoulder and the open end of said bore; an annular washer having one surface engaging said shoulder; a snap ring located in said groove and having a surface engaging the other surface of said washer for retaining the same against said shoulder; a retainer member slidable in said bore and interposed between and so proportioned to be retained in said bore by said washer and said slidable member; a push rod extending through said bore open end, said snap ring, said washer, and said retainer member into said recess of said slidable member; a thrust connection between said push rod and said slidable member; said push rod having an annular shoulder thereon; and means carried by said retainer member engaging said annular shoulder for limiting rearward movement of said push rod and retaining the same in assembled relationship with said slidable member.

7. The structure as recited in claim 8 wherein said means carried by said retainer member comprises resilient fingers for engaging said annular shoulder of said push rod.

8. The structure as recited in claim 6 wherein the outer periphery of said retainer member is spaced from the wall of said bore.

9. In a master cylinder: a housing having a cylindrical bore open at the rear end thereof, a member slidable in said bore, said slidable member having a recess intersecting the rear surface of said slidable member; said recess defining a circular opening at said intersection; an annular shoulder in the wall of said bore; an annular groove in the wall of said bore located between said shoulder and the open end of said bore; an annular washer having one surface engaging said shoulder; a snap ring located in said groove and having a surface engaging the other surface of said washer for retaining the same against said shoulder; a retainer member slidable in said bore and interposed between said washer and said slidable member; said retainer member comprising an annular base portion disposed in said bore in a plane substantially perpendicular to the axis of said bore and resilient fingers bent from the inner edge of said base portion extending into said recess; the outer diameter of said base portion of said retainer member being less than the diameter of said bore, but greater than the inner diameter of said washer and of the diameter of said circular opening whereby said retainer member is retained between said slidable member and said washer; a push rod extending through the open end of said bore, said snap ring, said washer and said retainer member into said recess of said slidable member, a thrust connection between said push rod and said slidable member; said push rod having an annular groove thereon; the free end of said resilient fingers being located within said groove for limiting rearward movement of said push rod.

10. In a master cylinder: a housing having a bore open at the rear end thereof; a member slidable in said bore; means secured to the wall of said bore adjacent the open end thereof; a retainer member slidably mounted in said bore and located between and proportioned to be retained in the bore by said means and the rear of said slidable member; a push rod extending through the open end of said bore, said means, said retainer member, and engaging said slidable member defining a thrust connection between said push rod and said slidable member; said push rod and said retainer member having means thereon coacting with each other to limit the rearward movement of said push rod and retaining the same in assembled relationship with said master cylinder.

11. In a master cylinder: a housing having a cylindrical bore open at the rear end thereof; a member slidable in said bore; means secured to the wall of said bore adjacent the open end thereof; a retainer member located in said bore between said means and the rear of said slidable member; said means being proportioned relative to said retainer member to prevent rearward movement of said retainer member out of said bore; a push rod extending through the open end of said bore, said means, said retainer member, and engaging said slidable member defining a thrust connection between said push rod and said slidable member; said retainer member being dimensionally smaller than the diameter of said bore for movement transverse to the axis of said bore; said push rod and said retainer member having means thereon coacting with each other to limit rearward movement of said push rod and retaining the same in assembled relationship with said master cylinder.

12. In a master cylinder: a housing having a bore open at the rear end thereof; a member slidable in said bore; means secured to the wall of said bore adjacent the open end thereof; a retainer member slidably mounted in said bore and located between and proportioned to be retained in the bore by said means and the rear of said slidable member; a push rod extending through the open end of said bore, said means, said retainer member, and engaging said slidable member defining a thrust connection between said push rod and said slidable member; means securing said retainer member to said push rod whereby said retainer member moves with said push rod, limits the rearward movement of said push rod and retains the same in assembled relationship with said master cylinder.

13. The structure as recited in claim 12, wherein said means securing said retainer member to said push rod comprises an annular groove on said push rod and resilient fingers on said retainer member extending into said groove.

14. In a master cylinder: a housing having a cylindrical bore open at the rear end thereof, a member slidable in said bore; means secured to the wall of said bore adjacent the open end thereof; a retainer member slidably mounted in said bore and located between and proportioned to be retained in the bore by said means and the rear of said slidable member; a push rod extending through the open end of said bore, said means, said retainer member and engaging said slidable member defining a thrust connection between said push rod and said slidable member; said retainer member being dimensionally smaller than the diameter of said bore for movement transverse to the axis of said bore; means securing said retainer member to said push rod whereby said retainer member moves with said push rod, limits the rearward movement of said push rod and retains the same in assembled relationship with said master cylinder.

15. The structure as recited in claim 14 wherein said means securing said retainer member to said push rod comprises an annular groove on said push rod and resilient fingers on said retainer member extending into said groove.

References Cited in the file of this patent

UNITED STATES PATENTS

| | | |
|---|---|---|
| 2,371,959 | Duffield et al. | Mar. 20, 1945 |
| 2,683,352 | Price | July 13, 1954 |
| 2,784,013 | Groen | Mar. 5, 1957 |